Figure 1:
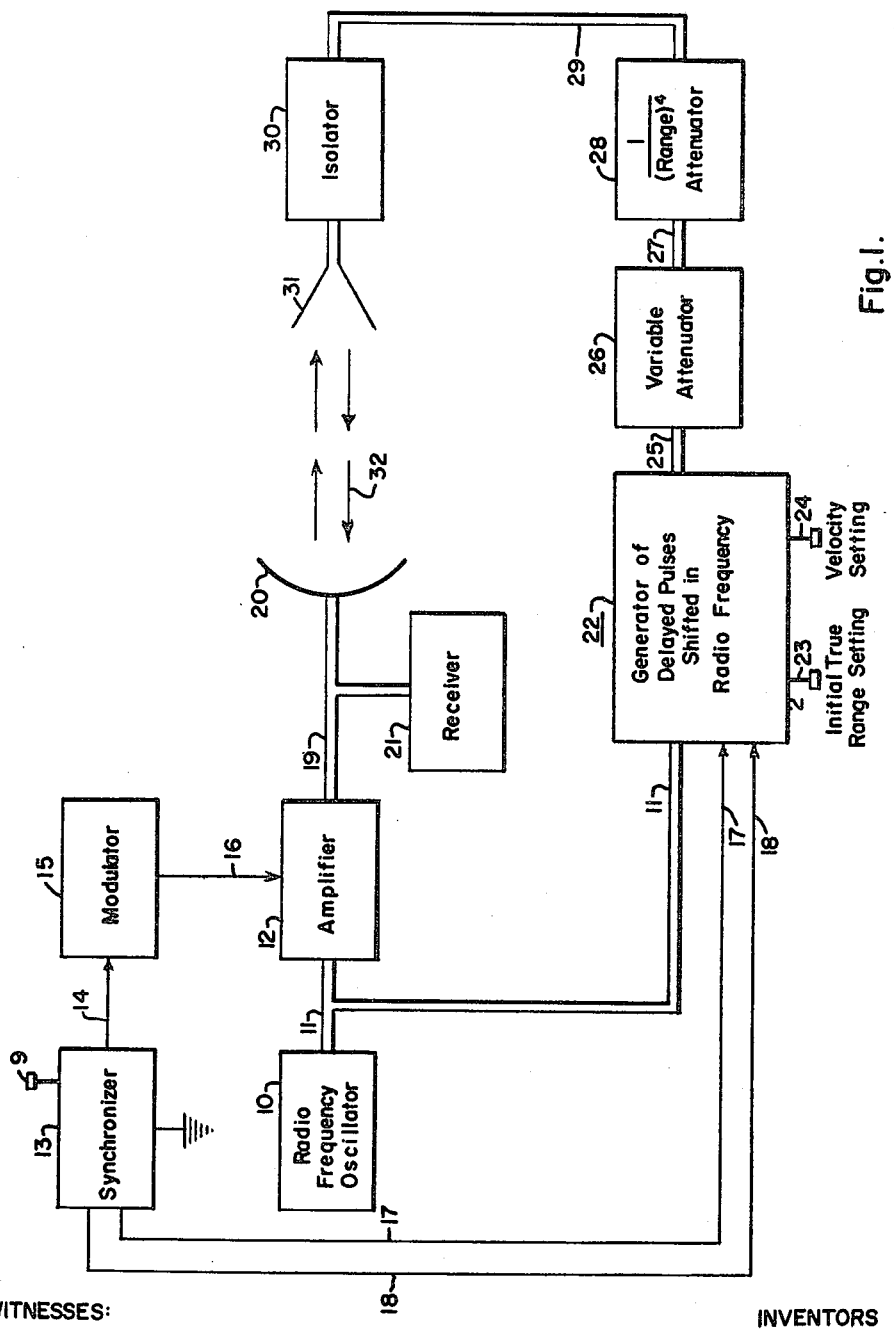

Jan. 23, 1962 W. A. SKILLMAN ETAL 3,018,478
PULSE DOPPLER MOVING TARGET SIMULATOR
Filed Aug. 5, 1957 2 Sheets-Sheet 2

United States Patent Office 3,018,478
Patented Jan. 23, 1962

3,018,478
PULSE DOPPLER MOVING TARGET SIMULATOR
William A. Skillman, Linthicum Heights, and Walter Evanus and David H. Mooney, Jr., Glen Burnie, Md., assignors to Westinghouse Electric Corporation, East Pittsburgh, Pa., a corporation of Pennsylvania
Filed Aug. 5, 1957, Ser. No. 677,182
9 Claims. (Cl. 343—17.7)

This invention relates to radar target simulator apparatus, and more particularly to apparatus for simulating a moving target in a pulse Doppler radar system for measuring range and velocity.

In the testing of pulse Doppler radar apparatus it is necessary to generate a signal comprising a train of pulses of radio frequency energy which is offset in radio frequency by only a small selected amount, for example, a few kilocycles, from a known microwave radio frequency in order to simulate a moving target having a preselected velocity, while at the same time providing that the pulses are delayed by a preselected time interval from other pulses, in order to simulate a preselected range for the simulated target. Heretofore, no satisfactory method or apparatus has been avialable for simulating a moving target both as to velocity and range, for the purpose, for example, of testing pulse Doppler radar apparatus.

The apparatus of the instant invention is employed in conjunction with pulse Doppler radar apparatus of the type employing a stable local oscillator for generating a continuous wave radio frequency signal of the frequency to be transmitted, and a synchronizer unit in conjunction with a modulator for modulating or pulsing a radio frequency amplifier to provide pulses of radio frequency energy for radiation from the radar antenna. Conventional pulse Doppler receiver apparatus may be employed, and the same radar antenna employed for the transmitting and receiving operations.

A portion of the energy from the stable local oscillator is fed to a target simulator pulse generator which includes means for pulse modulating the portion of energy to obtain delayed pulses which are delayed in accordance with the value of a true-range voltage obtained in the apparatus by adding an initial range set-in voltage and a change-in-range voltage obtained by integrating a voltage or signal representing velocity, and also altering the radio frequency of the delayed pulses by a predetermined variable amount, to thereby provide a pulsed radio frequency signal for radiation back to the radar apparatus under test having pulses delayed by a time interval corresponding to the round trip radio wave propagation time to an imaginary or simulated target of preselected range, and having a radio frequency which varies from the generated radio frequency in the oscillator of the radar apparatus under test by a preselected amount in accordance with the simulated velocity of the simulated moving target.

Accordingly, a primary object of the invention is to provide new and improved radar target simulator apparatus.

Another object is to provide a new and improved true-range pulse Doppler moving target simulator.

Figure 2:
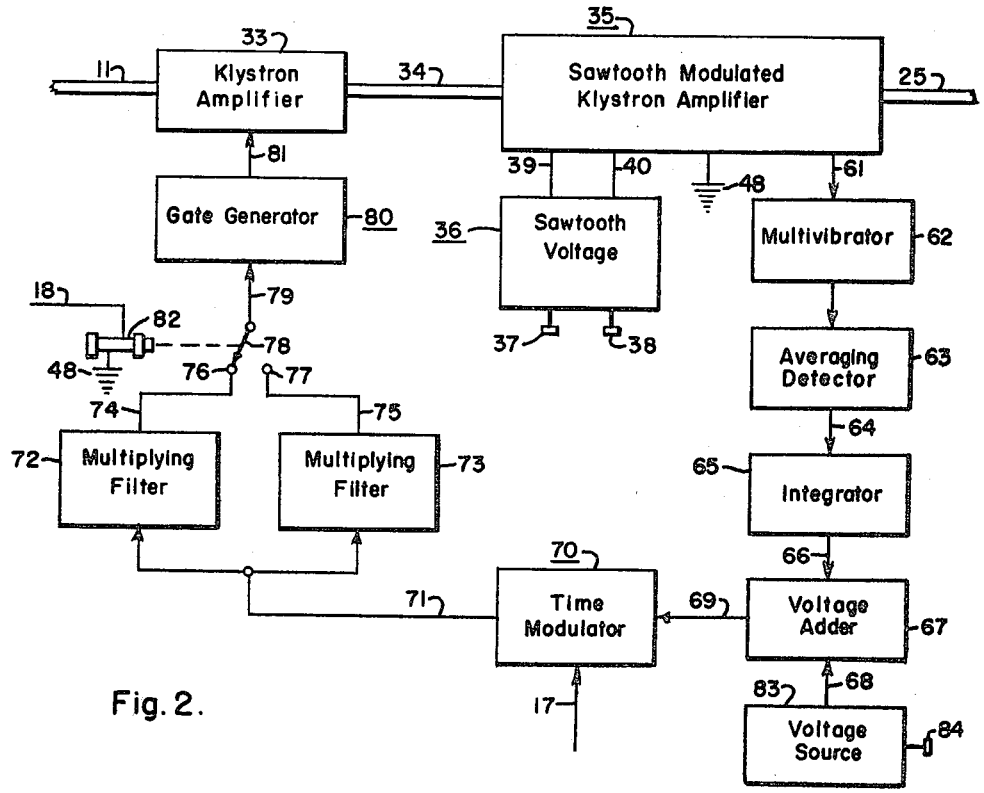
Figure 3:
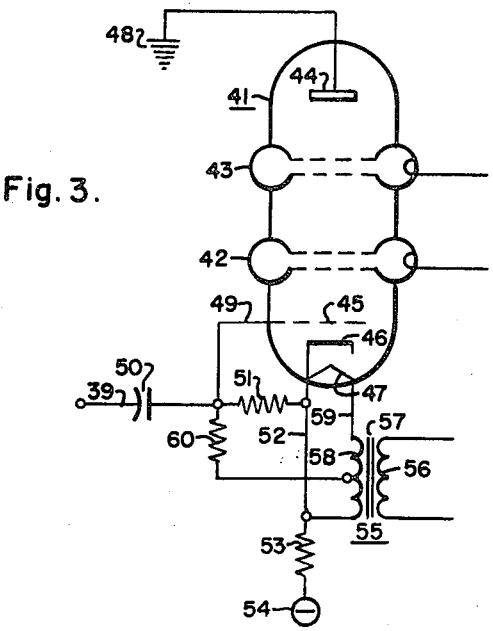

Other objects and advantages will become apparent after a study of the attached specification when read in connection with the accompanying drawings, in which:

FIGURE 1 is an electrical circuit diagram in block form of a pulse Doppler radar under test with simulator apparatus constructed according to the preferred embodiment of the invention;

FIG. 2 is an electrical circuit diagram in block form showing in more detail the circuit arrangement for delaying the pulses of energy to be radiated or otherwise transmitted to the radar apparatus under test to simulate a target in range, and also altering the radio frequency of the energy radiated to the radar apparatus under test to simulate a target having movement and a preselected velocity; and FIG. 3 is a schematic electrical circuit diagram of a suitable arrangement for altering the radio frequency of the energy to be radiated to the radar apparatus under test by a preselected variable amount.

Particular reference should be made now to the drawings in which like reference numerals are used throughout to designate like parts for a more complete understanding of the invention, and in particular to FIG. 1 thereof, in which there is shown at 10 as part of the radar apparatus under test, if desired, a stable oscillator of any convenient description for generating continuous wave radio frequency energy at the frequency to be transmitted or radiated by the radar apparatus. A portion of the energy output of the radio frequency oscillator 10 is conducted by a waveguide or other conducting means 11 to an amplifier shown in block form and designated 12, the amplifier 12 being of the type adapted to be pulse modulated to provide spaced pulses of radio frequency energy. Amplifier 12 may, if desired, be the klystron type. There is provided at 13 synchronizer apparatus, which may include means for generating a relatively low frequency pulse train having a preselected pulse repetition rate or pulse repetition frequency and having pulses of a preselected duration, means including repetition rate selector control 9 for utilizing the generated pulses to obtain another pulse train having a selected one of several pulse repetition frequencies each having a different multiple relationship to the generated low pulse repetition frequency, for application by conducting means 14 to a modulator 15 which may be of any convenient design, modulator 15 having its output applied by way of conducting means 16 to the aforementioned amplifier 12. The pulse train of low frequency timing pulses generated by the synchronizer 13 is also applied to conducting means 17, for reasons which will become hereinafter more clearly apparent, and the synchronizer 13 also generates and applies to conducting means 18 a pulse repetition frequency switching signal which varies in accordance with which of the pulse repetition frequencies bearing multiple relationships to the generated low frequency is applied by way of conducting means 14 to the aforementioned modulator apparatus 15. The switching signal on conducting means 18 is provided for purposes which will become hereinafter more clearly apparent.

The pulsed output of the aforementioned amplifier 12 is conducted by a waveguide or other means 19 to an antenna 20, and the waveguide 19 is also connected to receiving apparatus shown in block form and designated 21, the receiving apparatus being of any desired design and if desired separated from the amplifier 12 by suitable T-R devices, not shown, which are provided for preventing too substantial a portion of the energy in amplifier 12 from reaching the receiver 21, receiver 21 having conducted thereto radiant energy received by the aforementioned antenna 20. The receiver 21 may include any convenient means, not shown, for indicating the range and velocity of a radar target. The receiver 21, may, if desired, be of the type in which sweep, gate, or other control voltages are initiated or timed by the transmitted pulse, a small portion of the energy of which will reach the receiver 21 notwithstanding the use of T-R devices, not shown.

As stated hereinbefore, a generator of delayed pulses shifted in radio frequency is provided for simulating a moving target in range and velocity, is generally designated 22, and is constructed and arranged to receive a portion of the energy of radio frequency from oscillator 10 by way of waveguide or other conducting means 11, to pulse modulate this portion of energy at the same repetition frequency as the energy transmitted from antenna 20 but by pulses which are delayed a preselected amount in accordance with the simulated true range of the simulated target, to further shift the radio frequency of the pulsed energy by a preselected amount to correspond to the change in radio frequency which would result from the Doppler effect of a target moving at a preselected velocity, and to transmit the delayed pulses of shifted radio frequency for use by antenna 31 for radiation back to the antenna 20 for reception by the receiver 21, it being understood, as before stated, that the receiver 21 has indicating or measuring means of any convenient design, not shown, for indicating the range and velocity of a moving radar target.

Two settings or values are set into the aforementioned pulse generator 22: an initial true-range setting by means 23, of any convenient design, and hereinafter to be discussed in greater detail, and a velocity setting by means 24, of any convenient design, and which will hereinafter be described in more detail. The pulsed output from the pulse generator 22 is applied by way of a waveguide or other conductor means 25 to a variable attenuator 26 which may be of any convenient design, and thence, by waveguide or other conductor means 27 to an additional adjustable attenuator 28 which is provided, if desired, to attenuate the output of pulse generator 22 variably in accordance with the fourth power of the simulated range in order to calibrate the sensitivity of receiver 21, and thence by waveguide means 29 to a unilateral transmission device or isolator generally designated 30, which may be of any convenient design, such for example, as a ferrite isolator, and thence to horn or other antenna means 31 for radiation by path 32 back to the antenna 20, the energy thence being conducted by waveguide means 19 to receiver 21. It should be noted that the energy transmitted or radiated from antenna 20 to antenna 31 is dissipated in isolator 30.

Particular reference should be made now to FIG. 2, in which there is shown the internal circuit arrangement of the aforementioned pulse generator 22 which provides delayed pulses shifted in radio frequency. The waveguide 11 as aforementioned conducts radio frequency energy from the oscillator 10 to a klystron tube or other suitable amplifier shown in block form and designated 33. The output of amplifier 33 is conducted by waveguide means 34 to an additional klystron amplifier having circuit means associated therewith for phase modulating the energy applied thereto and changing the radio frequency output obtained therefrom, this klystron tube amplifier being shown in block form and generally designated by the reference numeral 35, the output of the klystron 35, shifted in frequency from the frequency of the energy in waveguides 11 and 34 being applied by the aforementioned waveguide means 25 and other components or members shown in FIG. 1 to the aforementioned antenna 31 for radiation to the antenna 20 and thence to receiver 21. A generator for a voltage of sawtooth waveform is shown in block form and generally designated 36, having frequency and amplitude controls 37 and 38 respectively, the sawtooth voltage generator being of any convenient design and delivering its output by way of leads 39 and 40 to the aforementioned klystron amplifier 35. Frequency control 37 corresponds to velocity set-in 24 of FIG. 1, for reasons which will become hereinafter more clearly apparent. Control 37 may vary the frequency in any convenient way, as by changing the value of a resistor.

It is known in the art that a klystron amplifier tube may be phase modulated by periodically varying one or more of the electrode voltages applied thereto. Particular reference should be made now to FIG. 3, in which there is shown a schematic electrical circuit diagram of a suitable modulating circuit. The circuit of FIG. 3 constitutes no part of the present invention, being described and claimed in a co-pending application by Lewis S. Heyser, William A. Skillman, and David H. Mooney, Jr., Serial No. 637,531, filed January 31, 1957, entitled Pulse Doppler Simulator and assigned to the assignee of the instant invention. As was pointed out in the above-identified co-pending application, a simple and accurate means for producing a radio frequency signal offset in frequency by a preselected amount from a given radio frequency is obtained by employing a grid controlled klystron amplifier tube of the two resonator type. Operatively connected to the klystron amplifier is a circuit for producing phase modulation by periodically altering the electron transit time in the klystron tube a predetermined amount. This is accomplished by periodically changing or modulating the cathode voltage on the klystron tube by superimposing a sawtooth voltage on the direct current cathode supply voltage. The amplitude of the sawtooth voltage is preferably adjusted to produce a shift of exactly $2\pi$ radians, with the result that the phase of the microwave signal will be changed by one radio frequency cycle during the slope of the sawtooth voltage. Thus, one radio frequency cycle of the signal of microwave frequency is added or subtracted for each cycle of the sawtooth voltage depending upon whether the modulating voltage is a positive-going or negative-going sawtooth. The frequency of the sawtooth voltage is conveniently controlled as by a variable resistor in the circuit of the sawtooth voltage generator, and hence, the frequency by which the output of the klystron amplifier differs from the frequency of the input may also be conveniently controlled.

In the apparatus of FIG. 3, the reference numeral 41 generally designates a klystron tube of the two-resonator type having a first or buncher resonator 42, a second or output resonator 43, a collector 44, a grid 45, a cathode 46, and a heater 47. The aforementioned resonator 42 is energized from the aforementioned waveguide 34, energy being coupled from the waveguide into the resonator by any suitable means, such for example, as a stub line shown in FIG. 3. Resonator 43 delivers its output to the aforementioned waveguide means 25, energy being coupled from resonator 43 into the waveguide 25 by any suitable means, such for example as the stub line shown. Collector 44 is connected to ground 48. Control grid 45 is connected by way of lead 49 and capacitor 50 to the aforementioned lead 39 for receiving the output of the sawtooth voltage generator 36. Lead 49 is also connected by way of resistor 51 and lead 52 to the aforementioned cathode 46, lead 52 being connected by way of resistor 53 to the negative terminal 54 of a suitable source of direct current cathode potential, not shown, the other or positive terminal of the source of direct current potential being connected to ground 48. A transformer generally designated 55 having primary 56, core 57 and center-tapped secondary 58 is provided for heating the aforementioned heater 47, the secondary 58 being connected by lead 59 to one terminal of the heater element 47 and by the aforementioned lead 52 to the other terminal thereof. The aforementioned lead 49 is also connected by way of resistor 60 to the center tap of the aforementioned secondary 58.

It will be understood that the sawtooth voltage generator delivers its output between lead 39 and the aforementioned lead 40, FIG. 2, which may be connected to ground 48.

In the operation of the apparatus of FIG. 3, the sawtooth voltage applied to the cathode 46 by way of capacitor 50 and resistor 51 periodically increases and decreases the potential on the cathode 46. The amplitude of this voltage is adjusted by any suitable control means 38, FIG. 2, to produce a phase shift of exactly $2\pi$ radians, with the result that the energy in resonator 43 is altered by one radio frequency cycle during each sawtooth portion, after which the phase quickly jumps back to its starting point during the flyback. Accordingly, assuming for the purposes of description that the sawtooth voltage on lead 39 has a negative-going slope, phase modulation of klystron tube 41 is accomplished in which one radio frequency cycle is subtracted from the frequency in resonator 42 for each cycle of the sawtooth voltage applied to lead 39. Preferably, the sawtooth voltage has a rapid flyback to reduce the amount of discontinuity in the output waveform.

The application of a sawtooth voltage to the cathode of the klystron tube would normally cause a periodic increase and decrease in the power output of the klystron. Accordingly, there is incorporated in the circuit of FIG. 3 means for substantially eliminating any amplitude modulation resulting from the application of the sawtooth voltage. This is accomplished by feedback, or introducing the sawtooth voltage in proper polarity and amplitude on the grid 45 of the klystron tube 41 to thereby hold the gain of the klystron amplifier substantially constant over the period of the sawtooth wave and prevent amplitude modulation. In FIG. 3, the resistor 51 controls the amount of feedback and its resistance value is selected accordingly. Preferably, circuit means is provided whereby the grid 45 of the klystron tube 41 is also used to cancel the modulation normally produced by the alternating current heater voltage of the klystron. Accordingly, a small amount of alternating current voltage of the proper phase for cancellation is introduced on the grid 45 by way of the resistor 60.

In summary then, in the operation of the circuit of FIG. 3, the cathode voltage of the klystron 41 is periodically altered by superimposing the sawtooth voltage on the direct current supply voltage from terminal 54 and the relative phase of the output changes continuously during the fall of the sawtooth voltage. If, as previously assumed, a negative-going sawtooth voltage is employed, the frequency of the output voltage obtained from resonator 43 will be decreased one radio frequency cycle from that in resonator 42 for each cycle of the sawtooth voltage.

Particular reference should be made again now to FIG. 2. Lead means 61 is connected to the aforementioned klystron amplifier 35 and has a voltage applied thereto which varies at a rate corresponding to the frequency of the sawtooth voltage. The lead means 61 applies the voltage thereon to a circuit which develops a D.C. voltage whose amplitude is proportional to the frequency of the sawtooth and whose polarity depends on whether the sawtooth is a negative or positive-going waveform. Such a circuit is shown as consisting of a multivibrator, which may be of conventional design, shown in block form and designated 62, which supplies an output to an averaging detector, shown in block form and generally designated 63, the averaging detector being of any convenient design, the multivibrator and averaging detector providing a circuit arrangement for in effect counting the sawtooths of the applied waveform on lead 39 and thereby ascertaining or measuring the frequency of the sawtooth voltage. The averaging detector is constructed and arranged to provide a direct current output voltage proportional to the velocity of the simulated target in accordance with the sawtooth frequency. This direct current voltage proportional to velocity is applied by way of lead means 64 to an integrator circuit generally designated 65 and shown in block form, the integrator 65 being of any convenient design and constructed and arranged to apply on lead means 66 a voltage proportional to the change in range, change in range being an integral of velocity, as will be readily understood by those skilled in the radar art. The voltage on lead 66 representing change in range is applied to a voltage adding device 67, which also has applied thereto on lead 68 an initial-range direct current voltage obtained from source 83 having control 84 for adjusting the value of the initial range voltage. Control 84 corresponds to set-in 23 of FIG. 1. Voltage adder 67, FIG. 2, accordingly provides on lead means 69 a true-range voltage representing initial range plus change in range.

The true-range voltage on conducting means 69 is applied to a time modulator or pulse position modulator, generally designated 70 and shown in block form, the time modulator 70 being of any convenient design and constructed and arranged to receive pulses of a low pulse repetition frequency by way of lead 17 from the aforementioned synchronizer and pulse generator 13 of FIG. 1 and to delay the pulses received on conducting means 17 in amounts depending upon the value of the true-range voltage applied thereto from lead 69, and to apply the delayed pulses to lead means 71. Suitable circuits for use in pulse time modulator or pulse position modulator 70 are shown in Fig. 5–10 on page 125, and in Fig. 5–13 on page 128, of "Electronic Time Measurements" by Chance, Hulsizer, MacNichol and Williams, Vol. 20, Radiation Laboratory Series, First Ed., 1949, McGraw-Hill Book Company, Inc., New York, New York.

As previously stated herein, the synchronizer 13 is constructed and arranged to utilize relatively low frequency timing pulses to obtain therefrom pulses having a plurality of repetition rates related in multiples to the low frequency. By way of illustration, apparatus having available two pulse repetition frequencies is shown. The delayed pulses on the aforementioned lead means 71 are applied to two multiplying filters, shown in block form and generally designated 72 and 73, these multiplying filters being of any convenient conventional design and applying to respective lead means 74 and 75 pulse trains having pulse repetition frequencies which are selected different multiples of the pulse repetition frequency on lead 71. These filters 72 and 73, which select harmonics of the fundamental timing frequency, are desirable in order to obtain a high PRF system from a low frequency synchronizing source and maintain frequency coherency. By this means the delay in degrees of phase shift is multiplied by the filter multiplying factors. The result is a large dynamic phase shift of the output pulse train of $n$ times 360 degrees, where $n$ is the multiplying factor, with less than 360 degrees phase shift of the synchronizing pulses through the time modulator 70. Lead means 74 and 75 are connected to relay contacts 76 and 77 respectively which are adapted to selectively make contact with a movable relay armature 78, armature 78 being connected by lead means 79 to a gate generator of any convenient design shown in block form and generally designated 80, the periodic output of the gate generator 80 being at the same repetition rate as that of the signal on lead 79 and applied by lead means 81 to the aforementioned klystron amplifier 33 which is constructed and arranged to provide pulses of radio frequency energy in waveguide means 34 coincident with the occurrence of the gate signals applied to the klystron amplifier by lead 81. Armature 78 has the position thereof controlled by relay winding 82, of any convenient design, energized by way of the aforementioned lead 18 from the aforementioned synchronizer 13, FIG. 1.

The operation of the above-described apparatus of FIG. 2 may be summarized as follows: continuous wave radio frequency energy is supplied to the klystron amplifier 33 by way of waveguide 11 from the stable radio frequency oscillator 10, FIG. 1, and pulses of a low repetition frequency bearing a submultiple relationship to the pulse repetition frequency of the transmitted radio energy are applied by way of lead means 17 to the aforementioned time modulator 70. The time modulator 70 as aforementioned is constructed and arranged to pass the pulses on lead means 17 to lead means 71 after the pulses are delayed by a predetermined time interval which varies in accordance with variations in the true-range voltage on lead means 69, this time delay internal corresponding to the round-trip wave propagation time from the radar apparatus under test to the simulated target in accordance with the simulated range thereof. The delayed pulses on lead means 71 are applied to the pair of multiplying filters 72 and 73, filter 72 being constructed and arranged to utilize the pulses applied thereto to obtain an additional series of pulses having a first pulse repetition frequency bearing a multiple relationship to the frequency of the pulses on lead means 71, the pulse output of multiplying filter 72 being applied by way of lead means 74 to terminal 76 of the single-pole, double-throw relay including arm or armature 78 and the additional terminal or contact 77. The pulses on the aforementioned lead 71 are also applied to the aforementioned second multiplying filter 73 which is constructed and arranged to supply a pulse output train on lead 75 having a second pulse repetition frequency bearing a multiple relationship to the frequency of the pulses on input lead means 71 but different in frequency from the frequency of the pulses on lead 74. The pulse output on lead 75 is applied to the aforementioned relay terminal 77. The multiplying filters 72 and 73 are constructed and arranged to provide as their outputs pulse trains having pulse repetition frequencies which are the same as the pulse repetition frequency outputs of the aforementioned synchronizer 13, FIG. 1, applied by way of conducting means 14 to the aforementioned modulator 15. Selection of the pulse repetition frequency at both modulator 15 and lead 79 is conveniently controlled by the control 9, for the reason that relay armature 78 has the position thereof controlled from relay winding 82 which has the winding thereof connected between ground 48 and the aforementioned lead 18, synchronizer 13 supplying a switching voltage or a pulse repetition frequency selecting voltage on lead 18 in accordance with the setting of the selector control 9.

The illustrated selected pulses on lead 74 are applied by armature 78 and lead means 79 to the gate generator 80, the gate generated at 80 being applied by lead means 81 to the aforementioned klystron amplifier 33, the gate voltage on lead 81 actuating the klystron amplifier 33 to supply to the waveguide means 34 amplified pulses of radio frequency energy at the selected repetition frequency. These pulses of radio frequency energy are applied to the aforementioned sawtooth modulated klystron amplifier 35, and more specifically to the buncher resonator 42 of the klystron tube 41 in FIG. 3. The transit times of the electrons in klystron tube 41 are periodically increased and decreased in accordance with variations in the sawtooth voltage applied to the aforementioned lead 39. As aforementioned, the amplitude of the sawtooth voltage is adjusted by means 38, FIG. 2, to have an amplitude corresponding to that which produces a shift of exactly to $2\pi$ radians, with the result that the radio frequency is shifted one radio frequency cycle for each cycle of the applied sawtooth voltage, the frequency of the sawtooth voltage being controlled by the aforementioned control 37. The output resonator 43 of tube 41 in FIG. 3 is coupled to the aforementioned waveguide 25 for providing energy for radiation back to the radar apparatus under test. Connected to the sawtooth modulated klystron amplifier 35 in FIG. 2 by way of conducting means 61 is the aforementioned multivibrator 62 which may have the sawtooth voltage or a corresponding variable voltage applied thereto, multivibrator 62 being of the "one-shot" variety if desired and supplying its output to the averaging detector 63, the multivibrator and averaging detector providing a count of the frequency of the sawtooth voltage and providing on the aforementioned lead means 64 a voltage corresponding to the velocity of the simulated target. As will be readily understood by those skilled in the radar art, a moving target, because of the Doppler principle, provides energy reflected to the radar apparatus having a radio frequency which differs from the radio frequency of the transmitter or radiated energy by an amount depending upon the velocity of the target. The voltage of the aforementioned lead means 64 represents the velocity of the simulated target and this voltage is applied to the integrator 65, integrator 65 supplying to lead means 66 a voltage corresponding to the change in range of the simulated target, change in range being an integral of velocity. At mixer or adding means 67, there is added to the voltage representing change in range a set-in or initial voltage by lead means 68 corresponding to initial range, and these voltages when added provide on lead means 69 a voltage corresponding to the true-range of the simulated target. As aforementioned, this true-range voltage on lead means 69 is utilized to delay the pulses of radio frequency energy at modulator 70 to correspond to the time interval that it would take the pulses of radio frequency energy to be propagated to the target and return to the radar transmitting and receiving apparatus.

The delayed pulses of radio frequency energy obtained from amplifier 35, having a radio frequency which differs from the generated radio frequency in stable local oscillator 10 by an amount corresponding to the simulated velocity of the simulated target, are applied by the aforementioned waveguide means 25 to the aforementioned variable attenuator 26. The variable attenuator 26 supplies its output by way of waveguide means 27 to the aforementioned additional attenuator 28, which may be employed if desired and may be omitted if desired, the attenuator 28 being constructed and arranged to provide an output which varies as the reciprocal of the fourth power of the simulated range to thereby provide an output to waveguide means 29 which has a varying amplitude which corresponds substantially to the varying amplitude of radio frequency energy which would actually be received from a distant moving target in actual radar operation. Waveguide means 29 is coupled by way of the isolator 30 to the radiating horn 31, and the energy radiated from horn or antenna 31 follows the path designated 32 back to the antenna 20 where it is conducted by the aforementioned waveguide 19 to receiving apparatus 21. The energy reaching receiver apparatus 21 is, as aforementioned, substantially limited to radiant energy received by antenna 20.

It will have been noted that in FIG. 1 the stable local oscillator 10 supplies a voltage or signal of radio frequency to the amplifier 12 which also receives a modulator output from modulator 15 by way of conducting means 16, amplifier 12 providing as its output pulses for transmission from the radar antenna 20. It has been noted, however, that the transmitted energy does not return to the antenna 20 while pulse Doppler radar apparatus is under test, but that the radiant energy received by antenna 20 is obtained from the aforementioned klystron amplifier 35 and consists of pulses of radio frequency energy which are delayed from the transmitted pulses by an amount corresponding to the time that it would take the radio frequency waves to travel to the simulated target and return, and that the frequency of the radio frequency radiant energy received by antenna 20 differs from the radio frequency of the transmitted energy by an amount depending upon the simulated velocity of the simulated target.

There has been provided then, target simulator apparatus which accomplishes the aforedescribed objects of the invention, i.e., to provide a test signal for testing pulse Doppler radar apparatus which truly simulates a moving target both as to velocity and range.

Whereas apparatus has been shown and described in which one of two available pulse repetition frequencies may be selected for testing purposes, as hereinbefore stated more than two repetition frequencies could be employed, suitable switching means being provided, a suitable synchronizer 13 being provided and additional multiplying filters being provided in FIG. 2 to provide the additional pulse repetition frequencies.

Whereas there has been shown in FIG. 2 a pair of klystron tube amplifiers at 33 and 35, amplifier 33 being pulse modulated or gate controlled and amplifier 35 being sawtooth modulated, it should be understood that the two klystron tube amplifiers 33 and 35 may be replaced by a single travelling wave tube, not shown, and the gate voltage on conducting means 81 applied to the grid of the travelling wave tube, and the sawtooth voltage on lead 39 applied to the helix of the travelling wave tube.

Whereas a relay has been shown in FIG. 2 for switching pulse repetition frequencies, it should be understood that other switching means of any convenient type could be employed.

Whereas the invention has been described with reference to a negative-going sawtooth voltage corresponding to an opening target, it should be understood that a positive-going sawtooth voltage could be employed, if desired, in which case the output frequency of amplifier 35 would increase one radio frequency cycle for each cycle of the sawtooth voltage applied to the klystron tube; and the D.C. voltage at lead 64 would be of the opposite polarity, causing the integrator output to be reversed, thereby causing time modulator 70 to move the pulses at lead 81 in the opposite direction; i.e., a closing target is now simulated.

Whereas the invention has been shown and described with respect to an embodiment thereof which gives satisfactory results, it should be understood that changes may be made and equivalents substituted without departing from the spirit and scope of the invention.

We claim as our invention:

1. Radar target simulator apparatus for testing pulse Doppler radar apparatus, the radar apparatus to be tested having oscillator means for generating a continuous radio frequency signal of predetermined radio frequency and pulse producing means operatively connected to the oscillator means for producing pulses including pulses of radio frequency energy of said radio frequency having a preselected pulse repetition frequency, comprising, in combination, first radio frequency amplifier means adapted to be operatively connected to said oscillator means and having a portion of the signal energy generated in the oscillator means applied thereto, said first radio frequency amplifier means being gate controlled to provide pulses of radio frequency in the first amplifier means output at the repetition freqeuncy of the gate, second radio frequency amplifier means operatively connected to said first radio frequency amplifier means to receive the output thereof, means operatively connected to said second radio frequency amplifier means for modulating the same and altering the radio frequency in the output thereof a preselected amount from said predetermined radio frequency, said amount corresponding to the change in frequency which woud be caused by the Doppler frequency shift in the echo from a radar target moving at a preselected velocity with respect to the pulse Doppler radar apparatus under test, voltage producing means operatively connected to said second radio frequency amplifier means for producing a voltage proportional to said preselected velocity, integrator means operatively connected to said voltage producing means for producing from the voltage proportional to velocity a voltage proportional to the change in range of a simulated target moving at said preselected velocity, voltage adding means operatively connected to said integrator means and having said voltage proportional to change in range applied thereto, means operatively connected to said voltage adding means for supplying thereto a voltage proportional to the initial selected range of the simulated target, said voltage adding means adding the voltages applied thereto and producing an output voltage proportional to the instant true range of the simulated target, pulse position modulator means having the output voltage of the voltage adding means applied thereto, said pulse position modulator means being adapted to be connected to the radar apparatus under test to have applied thereto pulses from the pulse producing means of the Doppler radar apparatus under test, said pulse position modulator means employing said true range voltage to delay each of the pulses applied thereto an amount corresponding to the radio wave propagation and return time from the radar apparatus under test to a simulated target having said simulated true range, gate generating means operatively connected to said pulse position modulator means and to said first radio frequency amplifier means, the gate being applied to said first radio frequency amplifier means to provide delayed pulses of radio frequency energy in the output thereof, and radiating means operatively connected to said second radio frequency amplifier means for radiating the delayed pulses of radio frequency energy shifted in radio frequency by said preselected amount to the radar apparatus under test.

2. Simulator apparatus for simulating a moving radar target with respect to range and velocity for testing pulse Doppler radar apparatus, the radar apparatus to be tested having oscillator means for generating a continuous radio frequency signal of predetermined radio frequency and pulse generating means operatively connected to the oscillator means for generating pulses including a train of pulses of energy of said predetermined radio frequency having a preselected pulse repetition frequency comprising, in combination, gate pulse producing means including pulse position modulator means adapted to be operatively connected to the pulse generating means of the radar apparatus under test for producing a series of gate pulses of the same repetition frequency as said preselected pulse repetition frequency but delayed by a variable time interval by said pulse position modulator means in accordance with the value of a true range voltage applied to the pulse position modulator means, first radio frequency amplifier means adapted to be operatively connected to the oscillator means of the radar apparatus under test to receive a portion of the signal energy of said predetermined radio frequency therefrom, said first radio frequency amplifier means being operatively connected to the gate pulse producing means and having said gate pulses applied thereto and providing as an output pulses of radio frequency energy at said predetermined radio frequency but delayed in time in accordance with the value of the true range voltage, second radio frequency amplifier means connected to and energized from said first radio frequency amplifier means, means operatively connected to said second radio frequency amplifier means for shifting the radio frequency in the output thereof a preselected amount to correspond to the Doppler shift in frequency of an echo received from a radar target having a preselected velocity, means operatively connected to said second radio frequency amplifier means for producing a voltage proportional to the change in range of the simulated target in accordance with the simulated velocity, voltage adding means operatively connected to said means for producing a voltage proportional to change in range and having said voltage proportional to change in range applied thereto, means connected to said voltage adding means for supplying thereto a voltage corresponding to the initial range chosen for the simulated target, said voltage adding means producing a true range voltage, said voltage adding means being operatively connected to said pulse position modulator means and applying the true range voltage thereto, and radiating means operatively connected to said second radio frequency amplifier means for radiating the delayed pulses of radio frequency energy shifted in radio frequency back to the pulse Doppler radar apparatus under test.

3. In radar simulator apparatus for simulating the echoes of a moving radar target produced by pulsed radar apparatus having a predetermined pulse repetition frequency, in combination, gate controlled radio frequency amplifier means adapted to have applied thereto continuous wave radio frequency energy at a predetermined radio frequency corresponding to that transmitted by the radar apparatus, pulse generating and multiplying means including pulse position modulator means, said pulse position modulator means being adapted to have applied thereto pulses recurring at a submultiple of said pulse repetition frequency and to delay said pulses in accordance with the value of a true range voltage applied thereto, said pulse generating and multiplying means being operatively connected to said radio frequency amplifier means to supply the gate thereto, means operatively connected to said radio frequency amplifier means for shifting the radio frequency therein a preselected amount from said predetermined radio frequency in accordance with the Doppler frequency shift in an echo received from a target moving at a predetermined simulated velocity, voltage producing means operatively connected to said radio frequency amplifier means for producing a voltage proportional to the change in range of the simulated target, voltage adding means having said last-named voltage applied thereto and having an initial range voltage applied thereto for obtaining said true range voltage for application to said pulse position modulator means, said voltage adding means being operatively connected to said pulse position modulator means, and radio wave energy transmission means operatively connected to said radio frequency amplifier means, said radio frequency amplifier means supplying to said transmission means pulses of radio frequency energy of said pulse repetition frequency having the pulses thereof occurring at preselected times in accordance with the range of the simulated target and having a radio frequency shifted by a preselected amount from said predetermined radio frequency in accordance with the simulated velocity of the simulated target.

4. Radar target simulator apparatus for simulating the echoes of a moving radar target produced by pulsed radar apparatus having a predetermined pusle repetition frequency, comprising, in combination, first radio frequency amplifier means adapted to have applied thereto as an input a continuous wave radio frequency signal of a predetermined radio frequency corresponding to that transmitted by the radar apparatus, periodic gate producing means including pulse position modulator means adapted to have applied thereto recurrent timing pulses and to delay said pulses in accordance with the value of a true range signal applied thereto, said gate producing means producing recurrent gating pulses at said pulse repetition frequency said gating pulses being applied to said first radio frequency amplifier means to thereby provide a pulsed output from the first amplifier means, second radio frequency amplifier means operatively connected to said first radio frequency amplifier means and having said output applied thereto, means operatively connected to said second radio frequency amplifier means for shifting the radio frequency of the energy therein a preselected amount from said predetermined radio frequency in accordance with the simulated velocity of a simulated target, signal generating means operatively connected to the second radio frequency amplifier means for generating a signal corresponding to the simulated velocity of the simulated target, other signal generating means operatively connected to said first named signal generating means and having the signal corresponding to velocity applied thereto for generating an additional signal corresponding to change in range, signal adding means operatively connected to said other signal generating means and having the signal corresponding to change in range applied thereto, said signal adding means being connected to said pulse position modulator means and also having applied thereto a signal corresponding to the initial range chosen for the simulated target and supplying said true range signal to said pulse position modulator means, and radio frequency energy transmission means operatively connected to said second radio frequency amplifier means, said radio frequency energy transmission means having applied thereto pulses of radio frequency energy at said pulse repetition frequency delayed by a time interval from the time of transmitted pulses corresponding to the radio wave propagation and return time from the radar apparatus to the simulated target in accordance with the simulated range thereof and having a radio frequency shifted from the predetermined radio frequency by an amount corresponding to the Doppler frequency shift in an echo from the simulated target in accordance with the simulated velocity thereof.

5. Radar target simulator apparatus for simulating the echoes of a moving target produced by pulsed radar apparatus having a predetermined pulse repetition frequency, comprising, in combination, first radio frequency amplifier means adapted to have applied thereto a continuous wave radio frequency signal of predetermined radio frequency corresponding to that transmitted by the radar apparatus, periodic gate generating means connected to said first radio frequency amplifier means, the periodic gate applied thereto providing a pulse radio frequency output having a pulse repetition frequency corresponding to the gate period, pulse position modulator means adapted to have a train of pulses recurring at a submultiple of said pulse repetition frequency applied thereto and operatively connected to said first radio frequency amplifier means, said pulse position modulator means being constructed and arranged to utilize the pulses applied thereto to obtain a series of pulses delayed in accordance with the value of a true range signal applied to the pulse position modulator means, frequency multiplier means having said delayed pulses applied thereto, the output from said frequency multiplier means being applied to said gate generating means, second radio frequency amplifier means operatively connected to said first radio frequency amplifier means to receive the output therefrom, means operatively connected to said second radio frequency amplifier means for varying the radio frequency of the energy therein a preselected amount from said predetermined radio frequency in accordance with the simulated velocity of the simulated target, means operatively connected to said second radio frequency amplifier means and having an initial range setting for obtaining said true range signal for application to said pulse position modulator means, and energy transmission means operatively connected to said second radio frequency amplifier means.

6. Target simulator apparatus for simulating the echoes of a moving radar target produced by pulsed radar apparatus having a predetermined pulse repetition frequency comprising, in combination, first klystron tube amplifier means, said first klystron tube amplifier means being adapted to have applied thereto continuous wave radio frequency energy of a predetermined radio frequency corresponding to the radio frequency of a radar transmitter, means including pulse position modulator means having a signal corresponding to the true range of the simulated target applied thereto and providing recurrent gate pulses at said pulse repetition frequency for pulse modulating said first klystron tube amplifier means, second klystron tube amplifier means having the output of the first klystron tube amplifier means applied thereto, sawtooth voltage generator means, means connecting said sawtooth voltage generator means to said second klystron tube amplifier means for utilizing the sawtooth voltage to phase modulate said second klystron tube amplifier means to thereby shift the radio frequency therein a preselected amount from said predetermined radio frequency, said amount corresponding to the Doppler shift in frequency of an echo signal from a radar target moving at a preselected velocity, means operatively connected to said second klystron tube amplifier means for generating a signal corresponding to change in range, signal adding means having said change in range signal applied thereto and having an initial range signal applied thereto for obtaining a true range signal for application to said pulse position modulator means, and radio wave energy transmission means operatively connected to said second klystron tube amplifier means.

7. Pulse Doppler radar target simulator apparatus for testing pulse Doppler radar receiving and transmitting apparatus of the type having an oscillator for generating a continuous radio frequency signal of predetermined radio frequency and pulsing means including pulsed amplifier means connected to the oscillator for producing pulses at a predetermined pulse repetition frequency, the radar apparatus to be tested also having antenna means for radiating and receiving pulses of radiant energy, comprising, in combination, first radio frequency amplifier means adapted to be operatively connected to said oscillator and having a portion of the signal energy generated in the oscillator applied thereto, said first radio frequency amplifier means being gate controlled to provide pulses of radio frequency in the first amplifier means output at the repetition frequency of the gating pulses, second radio frequency amplifier means operatively connected to said first radio frequency amplifier means to receive the output thereof, means operatively connected to said second radio frequency amplifier means for modulating the same and altering the radio frequency in the output thereof a preselected amount corresponding to the change in frequency which would be caused by the Doppler frequency shift in the echo of a radar target moving at a preselected simulated velocity with respect to the pulse Doppler radar apparatus under test, pulse delaying and multiplying means including pulse position modulator means, said pulse delaying and multiplying means being operatively connected to said first radio frequency amplifier means and being adapted to be connected to the radar under test to receive pulses from said pulsing means, said pulse delaying and multiplying means supplying the gating pulses to the first radio frequency amplifier means, said pulse position modulator means delaying the pulses applied thereto variably in accordance with variations in a true range signal applied thereto, true range signal generating means including signal adding means having an initial range signal applied thereto, said true range signal generating means operatively connecting the second radio frequency amplifier means to said pulse position modulator means, said true range signal generating means generating a signal corresponding to the change in range of the simulated target in accordance with the simulated velocity and adding to said last-named signal the initial range signal for producing said true range signal for application to said pulse position modulator means, radiating means for radiating energy towards the antenna of the radar under test and receiving radiant energy from the antenna of the radar under test, and energy transmission means including isolator means connecting said second radio frequency amplifier means to said radiating means, energy received by the radiating means from the antenna of the radar under test being dissipated in the isolator means, said energy transmission means conducting to the radiating means delayed pulses of radio frequency energy shifted in radio frequency by said preselected amount, the pulses being delayed from the pulses of the radar transmitter under test by a time interval corresponding to the radiant energy transit and return times from the radar under test to a target at the simulated true range, the radio frequency being shifted in an amount corresponding to the Doppler frequency shift of a target having the simulated velocity of the simulated target.

8. Pulse Doppler radar target simulator apparatus for testing pulse Doppler radar receiving and transmitting apparatus of the type having an oscillator for generating a continuous radio frequency signal of predetermined radio frequency and pulsing means including pulsed amplifier means connected to the oscillator for producing pulses at a predetermined pulse repetition frequency, the radar apparatus to be tested also having antenna means for radiating and receiving pulses of radiant energy, comprising, in combination, radio frequency amplifier means adapted to be operatively connected to said oscillator and having a portion of the signal energy generated in the oscillator applied thereto, said radio frequency amplifier means being gate controlled to provide pulses of radio frequency in the amplifier means output at the repetition frequency of the gating pulses, pulse delaying and multiplying means including pulse position modulator means, said pulse delaying and multiplying means being adapted to be operatively connected to the radar apparatus under test to receive pulses from said pulsing means, said pulse position modulator means delaying pulses variably in accordance with variations in a true range signal applied thereto, said pulse delaying and multiplying means being operatively connected to said radio frequency amplifier means to supply the gating pulses thereto at said predetermined pulse repetition frequency, means operatively connected to the radio frequency amplifier means for altering the radio frequency in the output thereof a preselected amount from said predetermined radio frequency, said amount corresponding to the change in frequency which would be caused by the Doppler frequency shift in the echo from a radar target moving at a preselected velocity with respect to the pulse Doppler radar apparatus under test, voltage producing means operatively connected to said radio frequency amplifier means for producing a voltage proportional to the change in range of a simulated target moving at said preselected velocity, a source of a variable voltage variable in accordance with an initial range setting, voltage adding means operatively connected to the voltage producing means and to said source and providing a true range voltage, said voltage adding means being connected to said pulse position modulator means for applying the true range voltage to said pulse position modulator means, radiating means for radiating energy toward the antenna of the radar under test and receiving radiant energy from the antenna of the radar under test, and transmission means including isolator means connecting the radiating means to said radio frequency amplifier means, energy received from the radar under test being dissipated in the isolator means, the radiating means transmitting to the antenna of the radar under test pulses at said predetermined pulse repetition frequency delayed from the pulses of the radar transmitter under test by a time interval corresponding to the transmission and return time of radiant energy to a target at the simulated true range, the radio frequency of the pulses transmitted by the radiating means being shifted in an amount corresponding to the Doppler shift in radio frequency of a simulated target moving at the simulated velocity.

9. Pulse Doppler radar target simulator apparatus for testing pulse Doppler radar receiving and transmitting apparatus of the type having an oscillator for generating a continuous radio frequency signal of predetermined radio frequency and pulsing means including pulsed amplifier means connected to the oscillator for producing pulses at a predetermined pulse repetition frequency, comprising, in combination, radio frequency amplifier means adapted to be operatively connected to said oscillator and having a portion of the signal energy generated in the oscillator applied thereto, said radio frequency amplifier means being gate controlled to provide pulses of radio frequency energy in the amplifier means output at the repetition frequency of the gating pulses, pulse delaying and multiplying means including pulse position modulator means, said pulse delaying and multiplying means being adapted to be connected to the pulsing means of the radar apparatus under test to receive pulses from said pulsing means, said pulse delaying and multiplying means being connected to said radio frequency amplifier mens to supply said gating pulses thereto, said pulse position modulator means delaying pulses variably in accordance with variations in a true range signal applied thereto, means connected to said radio frequency amplifier means for modulating the same and altering the radio frequency in the output thereof a preselected amount from said predetermined radio frequency, said amount corresponding to the change in frequency which would be caused by the Doppler frequency shift in the echo of a radar target moving at a preselected velocity with respect to the pulse Doppler radar apparatus under test, a signal source providing a signal corresponding to an initial range setting, signal producing means operatively connected to said radio frequency amplifier means for producing a signal proportional to the change in range of a simulated target moving at said preselected velocity, signal adding means operatively connected to said signal producing means and to said signal source, said signal adding means being operatively connected to said pulse position modulator means and applying thereto a signal corresponding to the true range of the simulated target, and energy transmission means operatively connected to said radio frequency amplifier means, said energy transmission means being adapted to transmit the output of the radio frequency amplifier means to the radar apparatus under test, the output of the radio frequency amplifier means being a series of pulses at said predetermined pulse repetition frequency delayed from the pulses of the radar transmitting apparatus under test by time intervals corresponding to the transmission and return time of radiant energy from the radar under test to a target at said simulated true range, the pulses being shifted in radio frequency by an amount corresponding to the Doppler frequency shift resulting from movement of a target at said simulated velocity.

References Cited in the file of this patent

UNITED STATES PATENTS

| | | |
|---|---|---|
| 2,421,016 | Deloraine | May 27, 1947 |
| 2,522,541 | Saxton et al. | Sept. 19, 1950 |
| 2,549,473 | Jacobs | Apr. 17, 1951 |
| 2,593,113 | Cutler | Apr. 15, 1952 |
| 2,683,855 | Blitz | July 13, 1954 |
| 2,836,813 | Flower | May 27, 1958 |
| 2,872,673 | Pleasure | Feb. 3, 1959 |